(12) United States Patent
Sakuma et al.

(10) Patent No.: US 7,498,071 B2
(45) Date of Patent: Mar. 3, 2009

(54) LAMINATED MATERIAL WITH IMPRINTED INFORMATION, ARTICLE ON WHICH THE SAME IS ATTACHED, METHOD FOR READING INFORMATION CODE

(75) Inventors: Kenichi Sakuma, Yokohama (JP); Masayoshi Wada, Yokohama (JP); Asa Kimura, Yokohama (JP)

(73) Assignee: Shiseido Co., Ltd., Chuo-ku, Tokyo (JP)

( * ) Notice: Subject to any disclaimer, the term of this patent is extended or adjusted under 35 U.S.C. 154(b) by 455 days.

(21) Appl. No.: 10/542,152

(22) PCT Filed: Jan. 16, 2004

(86) PCT No.: PCT/JP2004/000327

§ 371 (c)(1),
(2), (4) Date: Jul. 13, 2005

(87) PCT Pub. No.: WO2004/063978

PCT Pub. Date: Jul. 29, 2004

(65) Prior Publication Data

US 2006/0051562 A1 Mar. 9, 2006

(30) Foreign Application Priority Data

Jan. 6, 2003 (JP) .............................. 2003-008745
Feb. 28, 2003 (JP) .............................. 2003-053986

(51) Int. Cl.
*B32B 3/02* (2006.01)
(52) U.S. Cl. ............... 428/64.4; 428/29; 428/32.71; 428/142; 428/143; 428/172; 428/204; 428/402; 428/195.1; 428/324; 428/356; 359/529; 359/540; 359/577; 359/726; 359/727; 359/359; 359/356; 430/2; 430/229; 430/363

(58) Field of Classification Search ............. 428/195.1, 428/324, 32.71, 29, 64.4, 143, 142, 163, 428/172, 356; 359/356, 529, 540, 577, 726, 359/727; 430/2, 363, 229
See application file for complete search history.

(56) References Cited

U.S. PATENT DOCUMENTS 5,612,119 A * 3/1997 Olsen et al. .............. 428/32.71

(Continued)

FOREIGN PATENT DOCUMENTS

WO 01/03945 A1 1/2001

OTHER PUBLICATIONS

Japanese Patent Abstract Publication No. 2000-272300 published Oct. 3, 2000, two pages.

(Continued)

*Primary Examiner*—Bruce Hess
*Assistant Examiner*—Tamra L. Dicus
(74) *Attorney, Agent, or Firm*—Rankin, Hill & Clark LLP (57) ABSTRACT

It is an object of the present invention to provide a laminated member with an recorded information code, having a high reading accuracy, which do not detract from product design and which do not require a special reading apparatus. A laminated member 10 of the present invention comprises a transparent material layer 12 on which an information code is recorded, and a reflection-reduction layer 14 provided at the opposite side from a side where the information code is observed. The transparent layer 12 comprises low-reflectance portions 18 and high-reflectance portions 16 having a higher reflectance than the low-reflectance portions 18. The information code is recorded as a distributed pattern of the high-reflectance portions 16. The reflection-reduction layer 14 reduces reflected light advancing to the transparent material layer 12.

8 Claims, 8 Drawing Sheets

10:LAMINATED MEMBER WITH ENGRAVED INFORMATION

U.S. PATENT DOCUMENTS

| | | | | |
|---|---|---|---|---|
| 5,837,347 | A * | 11/1998 | Marecki | 428/143 |
| 6,000,804 | A | 12/1999 | Kimura | |
| 6,306,459 | B1 * | 10/2001 | Fleming | 427/163.4 |
| 6,641,874 | B2 * | 11/2003 | Kuntz et al. | 428/29 |
| 7,252,396 | B2 * | 8/2007 | Marecki et al. | 359/540 |

OTHER PUBLICATIONS

Japanese Patent Abstract Publication No. 01-220238 published Sep. 1, 1989, two pages.

Japanese Patent Abstract Publication No. 06-139393 published May 20, 1994, two pages.

Supplementary European Search Report for EP 04702847 mailed Jul. 9, 2008, three pages.

Japanese Patent Abstract Publication No. 06139393 published May 20, 1994, one page.

* cited by examiner

FIG.1

10:LAMINATED MEMBER WITH ENGRAVED INFORMATION

FIG.8

LAMINATED MATERIAL WITH IMPRINTED INFORMATION, ARTICLE ON WHICH THE SAME IS ATTACHED, METHOD FOR READING INFORMATION CODE

RELATED APPLICATIONS

This application claims priority to the Japanese Patent Application 2003-8745 dated on Jan. 16, 2003 and the Japanese Patent Application 2003-53986 dated on Feb. 28, 2003 is hereby incorporated with reference for all purposes.

BACKGROUND OF THE INVENTION

1. Field of the Invention

The present invention relates to laminated members on which an information code is recorded, articles to which the laminated members are attached, and methods for observing the information code, and more particularly, to an improvement of information reading performance obtained when an information code is formed on a transparent material layer of a laminated member.

2. Prior Art

Information codes such as bar codes and two-dimensional codes have been printed on components and on the packages of products for production management and distribution management. A well-known example is a point-of-sale (POS) information management system in which information codes are printed on products supplied to the market, and sales management and inventory management thereof are automatically performed with terminals in each shop and a host computer at a head office to which the terminals are connected. Two-dimensional codes can contain more information than one-dimensional bar codes, and can record many pieces of information such as production locations, production dates, and production numbers of products. To conduct complete production management and distribution management, it is necessary to use such information codes in this way.

General methods for writing such information codes in a metal surface or on a sheet include a laser marking method and an ink marking method. In the ink marking method, ink having a lightness (brightness) different from that of a base member is applied to a surface of the base member to write the code. In the laser marking method (using a YAG laser, a $CO_2$ laser, or the like), a surface of a film or a metal is irradiated by a laser to form indentations on the surface to write the code.

As a method for reading the information code written in this way, the lightness difference (contrast) between the code and the base member is usually used. Various automatic code recognition units using a CCD camera have been developed. A code written by the ink marking method is read by using a lightness difference between the code written with the ink and the base member. A code written by the laser marking method is read by using a difference in the amount of light reflected from the indented portions and non-indented portions (see, for example, Japanese Patent No. 2719287).

As described above, to apply complete distribution management to products and to eliminate imitated products completely, it is necessary to directly print information codes on products or to directly attach to products sticky labels on which information codes are printed. Since the ink marking method requires large difference of a lightness between a base member and ink (black and white are the easiest to read combination), colors which can be used for the base member and ink are highly restricted. Therefore, the design of products deteriorates significantly when information codes are printed on or attached to the products.

To prevent the design from deteriorating, an indented-and-non-indented code is printed on a transparent film with the use of the laser marking method and the transparent film is attached to a product to show the information code without detracting from the design of the product.

However, an indented-and-non-indented code made by the laser marking method does not generate a sufficient lightness difference (contrast) between indented portions and non-indented portions on the transparent film. Therefore, reading the code may be impossible in automatic code recognition by the use of a CCD camera, or some reading errors may occur.

To solve this problem, for example, Japanese Patent No. 2719287, described above, has proposed a recognition method in which a surface where an indented-and-non-indented code is formed is irradiated with light at a certain angle, and reflected light obtained from an edge of a non-intented portion is received. This method, however, has some disadvantages: namely, the reading conditions should be specified in detail because the light illumination angle and the position of a light-receiving section are restricted, the apparatus structure becomes complicated, and the apparatus becomes expensive. The method also has a disadvantage in that the laser marking conditions should also be controlled in detail.

SUMMARY OF THE INVENTION

Accordingly, it is an object of the present invention to provide a laminated member with an recorded information code, having a high reading accuracy, and a reading method for reading the information code on the laminated member, both of which do not detract from product design and which do not require a special reading apparatus.

A laminated member of the present invention comprises a transparent material layer on which an information code is recorded, and a reflection-reduction layer provided at the opposite side from a side where the information code is observed. The transparent layer comprises low-reflectance portions and high-reflectance portions having a higher reflectance than the low-reflectance portions. The information code is recorded as a distributed pattern of the high-reflectance portions. The reflection-reduction layer reduces reflected light advancing to the transparent material layer.

In the laminated member of the present invention, it is preferable to comprise a hologram layer, which reproduces an image with the use of incident light, at the opposite side of the transparent material layer from the side where the information code is observed.

In the laminated member of the present invention, it is preferable to comprise a retroreflection layer, which returns incident light in the direction opposite to a direction in which the incident light advances, at the opposite side of the transparent material layer from the side where the information code is observed.

In the laminated member of the present invention, it is preferable that the high-reflectance portions are indented portions provided on a surface of the transparent material layer and the low-reflectance portions are non-indented portions of the surface of the transparent material layer.

In the laminated member of the present invention, it is preferable that a pearl pigment is used in the reflection-reduction layer.

In the laminated member of the present invention, it is preferable that the reflection-reduction layer reduces light reflected by a surface of the article where the laminated member is attached and makes a difference in the amount of reflected light between the high-reflectance portions and the low-reflectance portions large.

In the laminated member of the present invention, it is preferable to comprise an adhesive layer for attaching to an article, at a rear side of the laminated member.

An information code observation method of the present invention comprises the steps of: illuminating a laminated member of the present invention, on which an information code is recorded, with light and detecting light reflected from the laminated member with a photodetector, and reading the information code from a difference in the amount of reflected light between the high-reflectance portions and the low-reflectance portions of the surface of the laminated member, by the use of a detection signal.

It is preferable that the laminated member of the present invention is attached to an article

DESCRIPTION OF THE PREFERRED EMBODIMENT

Figure 1:
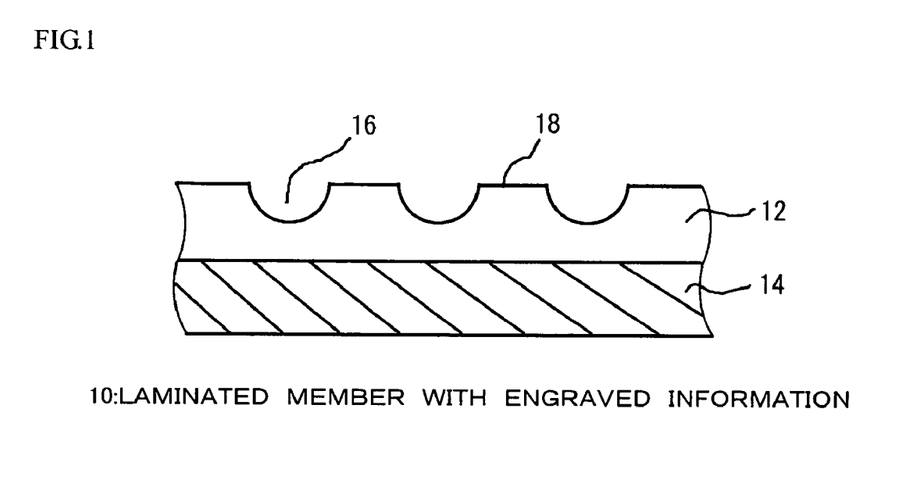
FIG. 1 is a cross-sectional views of a laminated member according to an embodiment of the present invention.

Information-engraved laminated members according to preferred embodiments of the present invention will be described below by referring to the drawings. FIG. 1 is a cross-sectional view of a laminated member according to a fundamental embodiment of the present invention. The laminated member 10 is formed by laminating a transparent material layer 12 having a high optical transmittance on a reflection-reduction layer 14. An information code is engraved as a distributed pattern of flat portions 18 (low-reflectance portions) and indented portions 16 (high-reflectance portions) formed almost as hemispheres at a surface of the transparent material layer 12. The radius of each indented portion 16 is usually about 100 μm, and the depth thereof is about 50 μm. Since the indented portions, made by a laser or other methods, and the flat portions, not machined, have different surface qualities, the amounts of light reflected therefrom differ. In the present invention, a low-reflectance portion has a high optical transmittance. A high-reflectance portion has a higher surface reflectance than the low-reflectance portion, but does not necessarily have a high reflectance. In other words, the high-reflectance portion and the low-reflectance portion need to have a reflectance difference even if it is a small difference. In the current case, since the information code is provided at the surface of the transparent material layer 12, the flat portions, that is, the portions other than the indented portions, pass most of the light. The indented portions have a slightly higher reflectance than the flat portions due to diffuse reflection at the surfaces.

Therefore, when the laminated member 10 is irradiated with light, the engraved information code can be read due to a difference in the amounts of light reflected from the indented portions 16 and the flat portions 18. A polyethylene terephthalate (PET) film 100 μm thick was used as the material of the transparent material layer 12, and a pearl pigment was used as the material of the reflection-reduction layer 14. With this structure, the reading accuracy for indented-and-non-indented code was increased. As the material of the transparent material layer 12, polyethylene (PE), polypropylene (PP), polystyrene (PS), polymethyl methacrylate (PMMA), glass, and others can be used, in addition to PET. The material is not limited to those described above. The information code may be a bar code or two-dimensional code, but is not limited to such a code.

The reason why the reading accuracy was increased compared with that in a conventional technology will be examined below.

Figure 2:
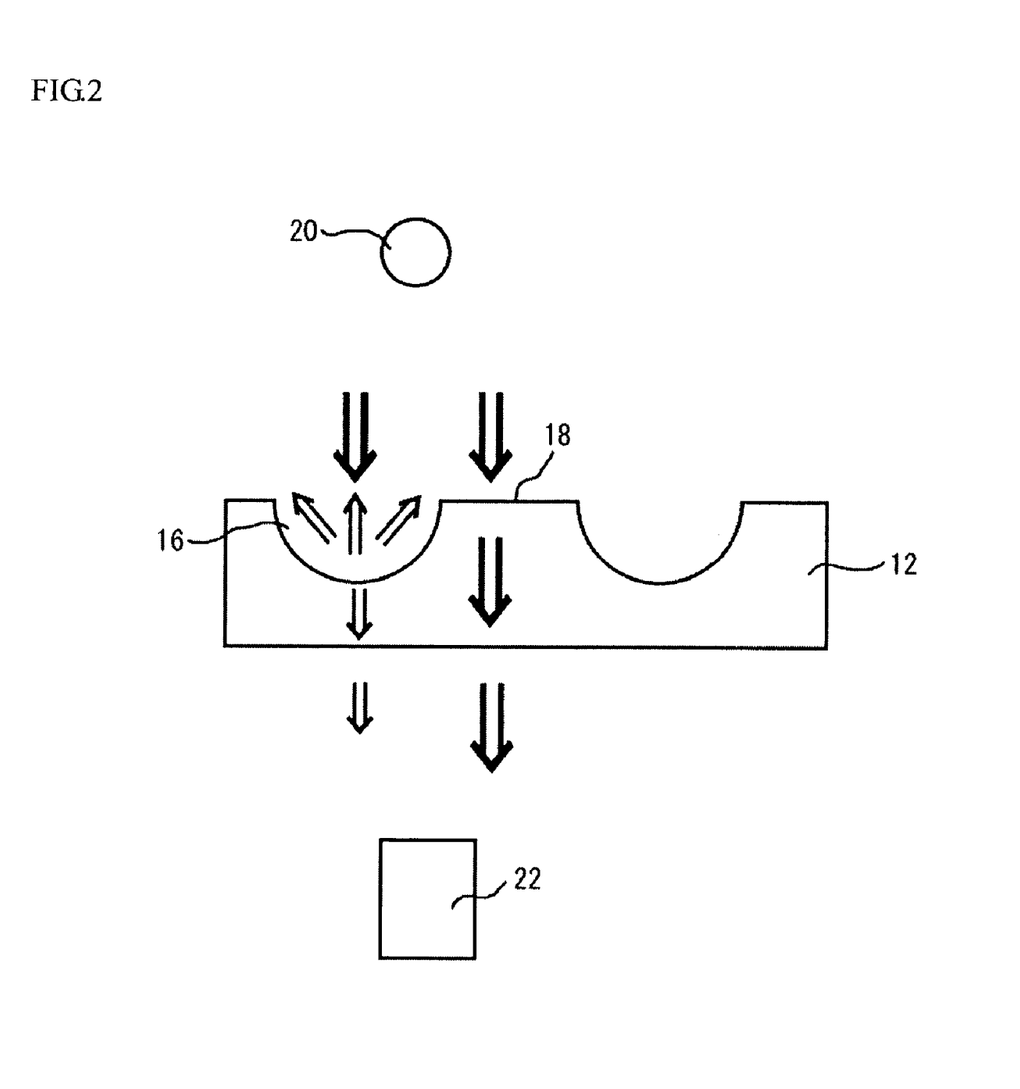
FIG. 2 is an explanatory view, which shows explanation of reading an information code with use of transmitted light.

For a comparison, a case in which an indented-and-non-indented code printed on a transparent material layer is observed by transmitted light will be described first. FIG. 2 shows a conventional recording member in which an information code having indented portions 16 and flat portions 18 is recorded on a surface of a transparent material layer 12. Light is emitted by a light source 20 at a side where the indented portions 16 are formed, and light passing through the transparent material layer 12 is observed by a photodetector such as a CCD camera 22. Since the transparent material layer 12 is made of a material having a high transmittance, most of the light incident on the flat portions 18 passes through the flat portions and little light is specularly reflected. On the other hand, light incident on the indented portions 16 is diffusely reflected. Specifically, the amount of light reflected by the indented portions 16 is increased due to an increase in the incident angle caused by the shapes of the indented portions 16, a change in the surface qualities of the indented portions 16 caused by laser machining, and so on. As a result, the amount of light passing through the indented portions 16 is smaller than the amount of light passing through the flat portions 18. Therefore, the CCD camera 22 can observe an image having a contrast between the indented portions and the flat portions.

Figure 3:
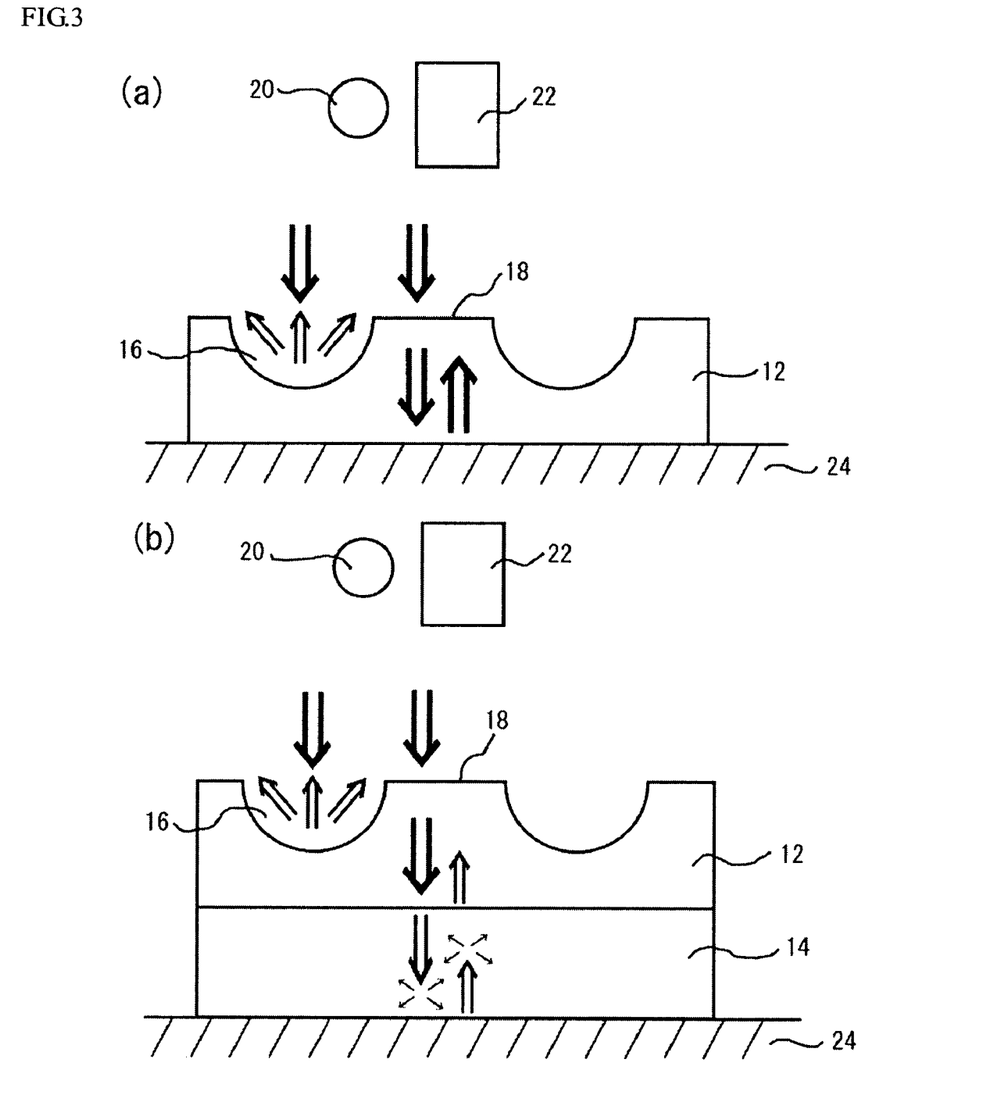
FIG. 3(a) and FIG. 3(b) are explanatory views, which show explanation of reading an information code with use of reflected light.

When the information code is read by transmitted light as described above, there is no problem in using a transparent material for the material on which the information code is engraved. However, if transmitted light cannot be observed, for example, in a case in which such a material is attached to a product, reflected light can be used to read the information code. FIG. 3(a) shows a code-observation case in which a transparent film (transparent material layer 12) on which an indented-and-non-indented code is engraved is attached to a product. The same reference numerals as those used in FIG. 2 are assigned to portions corresponding to those shown in FIG. 2. Light is emitted from a light source 20, and a photodetector such as a CCD camera 22 detects reflected light to read the information code. A substrate 24 shows a surface of the product on which the transparent material layer 12 is attached.

Since the transparent material layer 12 is made of a material having a high transmittance, as described above, most of the light incident on flat portions 18 passes through the flat portions 18 and little light is specularly reflected. On the other hand, light incident on the indented portions 16 is diffusely reflected. The indented-and-non-indented code printed on the surface of the transparent film should be able to be recognized by the difference in the amounts of reflected light between the flat portions 18 and the indented portions 16 if no other light comes in. In FIG. 3(a), however, since light reflected from the substrate 24 passes through the transparent material layer 12 to return toward the CCD camera 22 (photodetector), it is difficult to read the difference in the amounts of light reflected between the indented portions 16 and the flat portions 18. When the substrate 24 is made of a material having a high supecular (mirror) reflectance, such as a metal, a transparent film is not appropriate for the material on which the information code is engraved.

A reading experiment was performed with color paper being used as the substrate and its color being changed to various colors. The following table 1 shows the results of the experiment.

TABLE 1

| COLOR OF SUBSTRATE (COLOR PAPER) | READING ACCURACY |
| --- | --- |
| WHITE | X |
| BLACK | Δ |
| YELLOW | X |
| GREEN | X |
| BLUE | X |
| RED | X |

○: ALMOST NO ERRORS
Δ: SOME ERRORS OCCURRED
X: CAN SELDOM READ

Even with a black substrate, which shows the lowest reflectance, when the transparent film was directly attached to the substrate, the information code could not be read successfully.

In the present invention, a reflection-reduction layer 14 is provided under a transparent material layer 12 on which an indented-and-non-indented code is printed to reduce light reflected from a substrate 24, thereby solving the foregoing problem. FIG. 3(b) shows this case. A method for reading the information code in this embodiment is the same as a known usual method. A laminated member is irradiated with light emitted by a light source 20. The light is reflected from the laminated member and the reflected light is received by a photodetector (a CCD camera 22). An image received is formed by the contrast between high-reflectance portions (indented portions 16) and low-reflectance portions (flat portions 18). The image data is processed by a computing unit (not shown), such as a computer, to read the information code from the image data.

Light incident on the reflection-reduction layer 14 is scattered and absorbed by a pearl pigment (mica coated with titanium oxide) in the reflection-reduction layer 14, and as a result, the amount of light passing through is reduced. The mount of light specularly reflected from the surface of the reflection-reduction layer 14 is also small. Therefore, even when the laminated member 10 of the present embodiment is attached to a substrate 24 made of a material having a high optical reflectance, the amount of light specularly reflected from the rear surface of the laminated member 10 is small. Consequently, the indented portions 16 and the flat portions 18 produce different amounts of reflected light, which can be read by the CCD camera 22 (photodetector). It is thought that information code reading is made easier due to the foregoing reason. Actually, successful results were obtained in a reading test, described later.

According to the present embodiment, since high contrast is produced between the indented portions and the flat portions, highly accurate reading can be performed with a usual reading apparatus which uses a CCD, a lens, and other components. Information reading is not affected by the positional relationship between the light source and the reading apparatus.

Under general illumination light such as sunlight or fluorescent lamp, incident light has various incident angles. Since illumination light is incident on the surface from many directions, it is difficult to differentiate light diffused at the indented portions and light specularly reflected at the flat portions. Therefore, under general illumination, the information code on the surface of the transparent material layer is not clearly noticeable, which ensures the transparency of the laminated member and thus enhances security.

Figure 4:
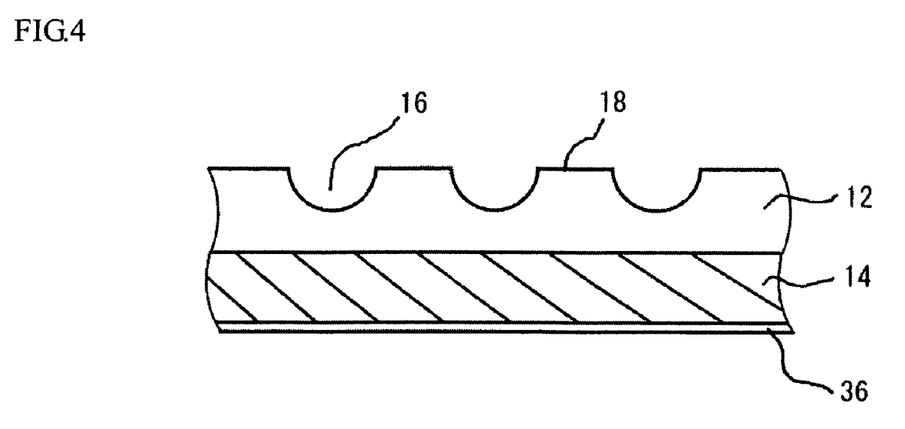
FIG. 4 is a schematic view, which shows an embodiment in which an adhesive layer is provided for a laminated member.

FIG. 4 shows an embodiment in which an adhesive layer is provided for a laminated member on which information is engraved. The same reference numerals as those used in FIG. 1 are assigned to portions corresponding to those shown in FIG. 1. In FIG. 4, an adhesive layer 36 is provided at a rear surface (surface where the information code is not engraved) of the laminated member. The laminated member is attached to goods by the adhesive layer 36. The laminated member may be directly attached to goods by the use of adhesive without specially providing the adhesive layer.

A laminated member according to the present invention can be attached to computer software packages, recorded music packages, cameras, cosmetic products, bags, and other goods. When a laminated member on which information is engraved is attached to such goods, it is useful to prevent the goods from being counterfeited and to manage information about the goods.

Usually, in product manufacturing management and distribution management, a label on which a manufacture date, manufacturing factory, manufacturing route, lot number, individual manufacture number and other information are recorded with the use of, for example, a bar code or two-dimensional code is attached to goods.

In some cases, inventory management and product sales management are automatically performed with the use of a POS system or other systems, as described in the related art.

Product distribution management is performed in the following way in some cases. An information code is attached to each product, and the information code and a product distribution destination are stored in association with each other in a host computer of a distribution source. When a plurality of products are collectively packaged, an information code which records information of each product is attached to the package, and the information code and the product distribution destination are stored in association with each other in the host computer of the distribution source. The information code may include a product distribution destination and the number of products to be distributed. When each product is received or sold at a shop, the information code is read and stored in a computer of the shop. The information code is sent to the host computer of the distribution source and verified with the information code which has been stored at the distribution source to check whether the product was shipped correctly. Thus, the distribution management is completely performed.

In some cases, process information and inspection information are recorded as a code in each process, and product manufacturing management is performed based on the recorded information. In some exhibitions, data such as the company names and addresses of invited guests is recorded as a two-dimensional code, and the code is read at the entrance gate to automatically generate a list of those present at the exhibition.

Since an information code engraved on a laminated member according to the present invention can be sufficiently correctly read, it can be used in product management, distribution management, and other management generally performed as described above.

A combination with a hologram film and/or a retroreflection layer according to another embodiment will be described next.

Figure 5:
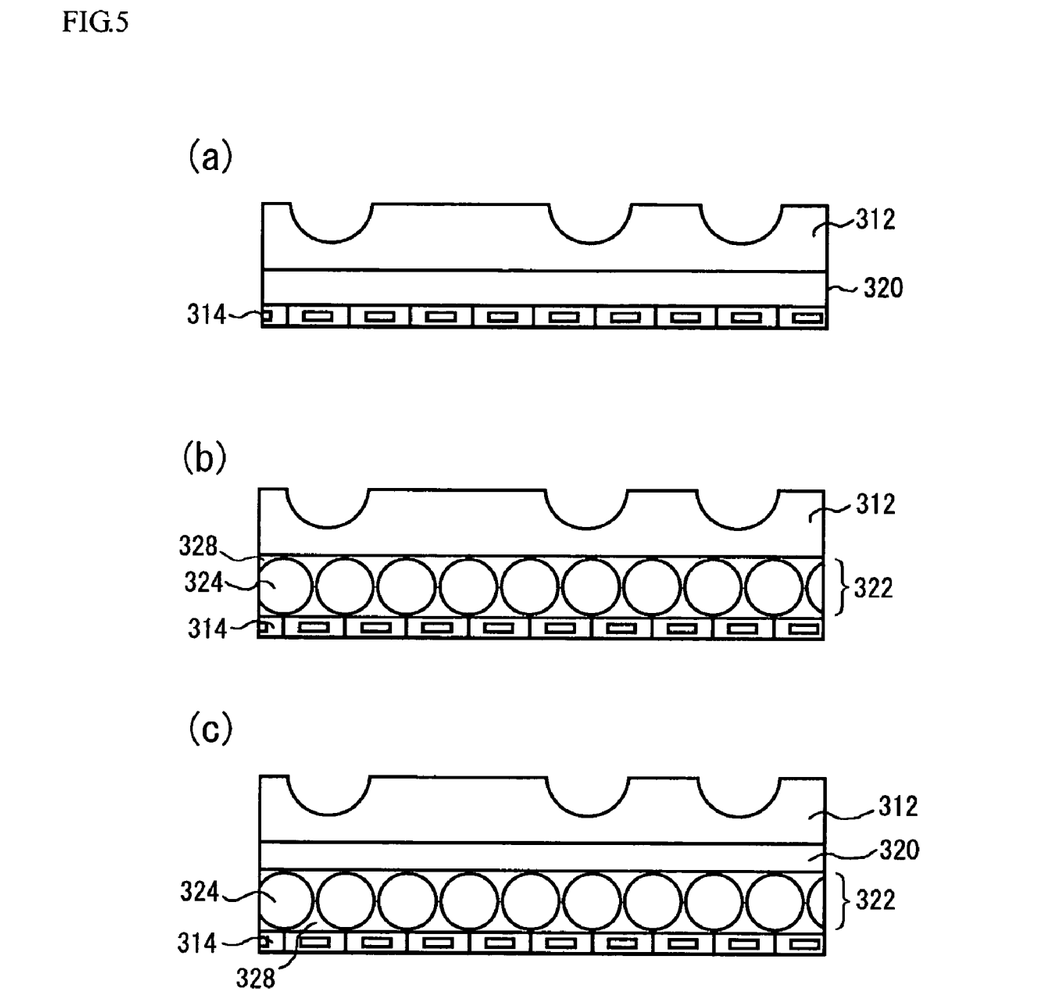
FIG. 5(a), FIG. 5(b) and FIG. 5(c) are schematic views of laminated members according to embodiments of the present invention.

FIG. 5(a) shows a cross-sectional view of a laminated member in which a transparent material layer 312, a hologram layer 320, and a reflection-reduction layer 314 are laminated. FIG. 5(b) shows a cross-sectional view of a laminated member in which a transparent material layer 312, a retroreflection layer 322, and a reflection-reduction layer 314 are laminated. FIG. 5(c) shows a cross-sectional view of a laminated member in which a transparent material layer 312, a hologram layer 320, a retroreflection layer 322, and a reflection-reduction layer 314 are laminated.

In any of the above structures, information is recorded by combinations of indented portions (high-reflectance portions) engraved on a surface of the transparent material layer 312 and flat portions (low-reflectance portions). Due to the same reason as described by referring to FIG. 1, reflected light is reduced by the reflection-reduction layer 314 to make it easier to read the indented-and-non-indented code recorded on the surface of the transparent material layer.

Interference fringes for reproducing a hologram image are recorded in the hologram layer 320. A semi-transparent or transparent hologram sheet is used for the hologram layer 320. The retroreflection layer 322 is provided with a retroreflection element, which returns incident light in the direction opposite the direction the incident light advances. The retroreflection element is formed by arranging a large number of transparent microspheres 324 having almost a spherical shape and a diameter of 30 to 80 μm in a resin layer 328. The transparent microspheres 324 produces light reflected in a direction almost the same as the direction opposite to the light incident direction. As the reflection-reduction layer 314, a pearl pigment (mica coated with titanium oxide) formed of plate-like mica and a titanium dioxide layer coated on the mica is used. In the present embodiment, the reflection-reduction layer 314 also serves as a reflection layer for the retroreflection layer. Since the pearl pigment is used for the reflection layer of the retroreflection layer, when linear light (which refers to light having the same propagation direction) is incident, interference colors caused by optical interference can be observed in retroreflected light. Since the pearl pigment is used as the reflection-reduction layer in the present embodiment, when it is laminated together with the retroreflection layer, it can also function as an interference material layer for producing interference colors in the retroreflected light. Details of the hologram layer and the retroreflection layer are disclosed, for example, in Japanese Unexamined Patent Application Publication No. 2000-81831 and No. 2000-272300.

In the same way as the laminated member shown in FIG. 4, an adhesive layer for attaching to goods may be provided at the rear surface (surface where the information code is not printed).

Figure 6:
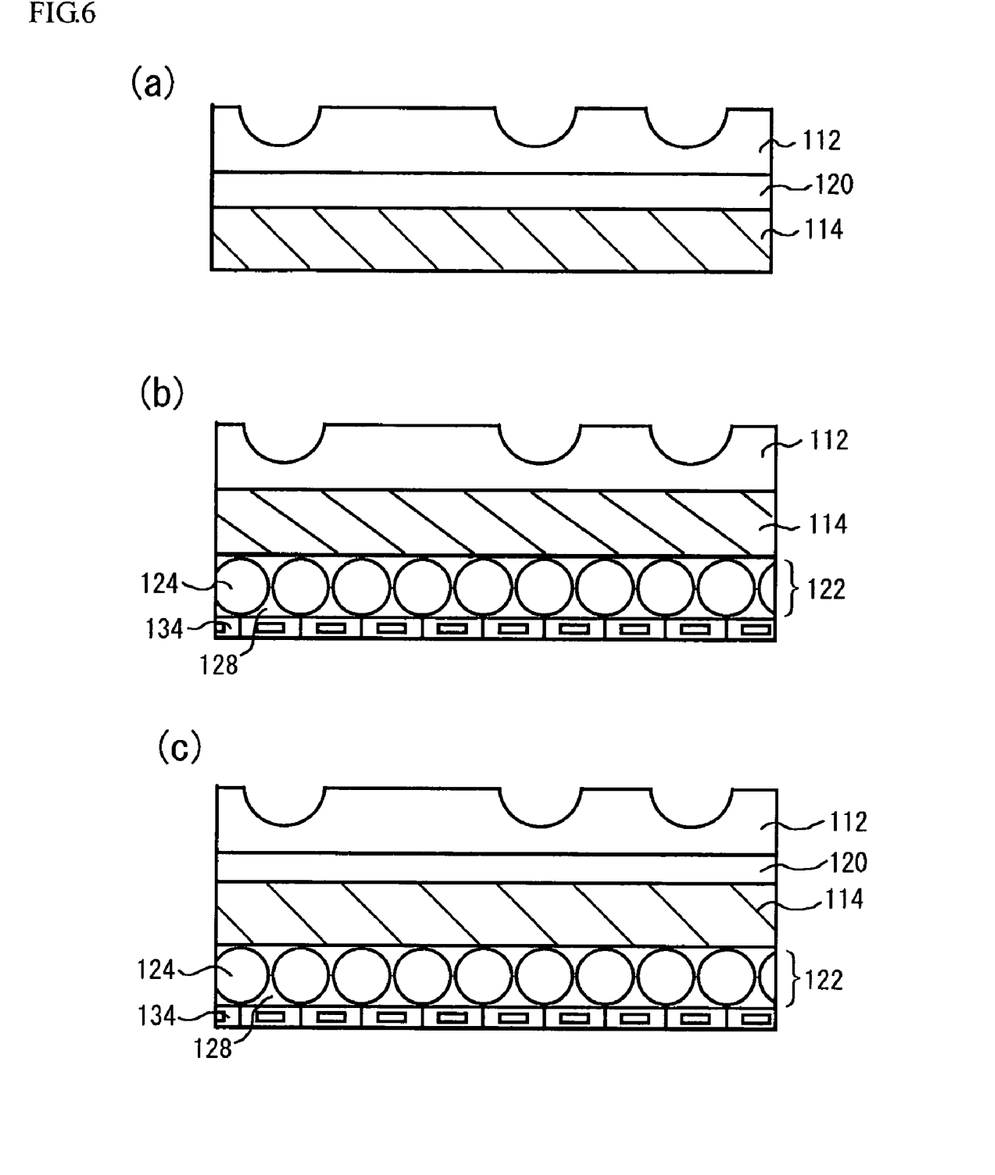
FIG. 6(a), FIG. 6(b) and FIG. 6(c) are schematic views of laminated members according to embodiments of the present invention.

In the above embodiment, the reflection-reduction layer is formed under the retroreflection layer in the laminated member. The reflection-reduction layer may be formed over the retroreflection layer, however. FIG. 6(b) and FIG. 6(c) show such cases. FIG. 6(a) shows a laminated member in which a transparent material layer 112, a hologram layer 120, and a reflection-reduction layer 114 are laminated in that order. FIG. 6(b) shows a laminated member in which a transparent material layer 112, a reflection-reduction layer 114, and a retroreflection layer 122 are laminated in that order. FIG. 6(c) shows a laminated member in which a transparent material layer 112, a hologram layer 120, a reflection-reduction layer 114, and a retroreflection layer 122 are laminated in that order. An information is recorded by combinations of indented portions (high-reflectance portions) engraved on a surface of the transparent material layer 112 and flat portions (low-reflectance portions). Interference fringes for reproducing a hologram image are recorded in the hologram layer 120. The retroreflection layer 122 is provided with a retroreflection element, which returns incident light in the direction opposite the direction the incident light advances. The retroreflection element is formed by arranging a large number of transparent microspheres 124 having almost a spherical shape and a diameter of 30 to 80 μm in a resin layer 128. As the interference material layer 134 which is formed under the retroreflection layer 122, a pearl pigment (mica coated with titanium oxide) formed of plate-like mica and a titanium dioxide layer coated on the mica is used. The retroreflection layer 122 and the interference material layer 134 produce interference colors in the retroreflected light.

When a laminated member according to the present embodiment is used with a hologram layer and/or a retroreflection layer, it improves the anti-counterfeiting effect. When a hologram layer is used, the information code is not clearly noticeable to the human eye due to optical diffusion (glittering surface) of the hologram, and the hologram can provide a good design. Since the information code is recorded by indented and non-indented portions formed at a surface of the transparent material layer, it does not detract from the hologram image.

A laminated member according to the present invention can be attached to the product tags of goods or goods themselves which can be counterfeit targets, such as computer software packages, recorded music packages, and big-name brand products (cameras, cosmetic products, clothing, and bags), to achieve counterfeit prevention. Goods on which a laminated member according to the present invention is attached can be visually distinguished from their counterfeits easily due to the improved anti-counterfeiting effect produced by using a hologram layer and/or a retroreflection layer in combination. At the same time, the information code engraved on the laminated member can be used for product information management.

Figure 7:
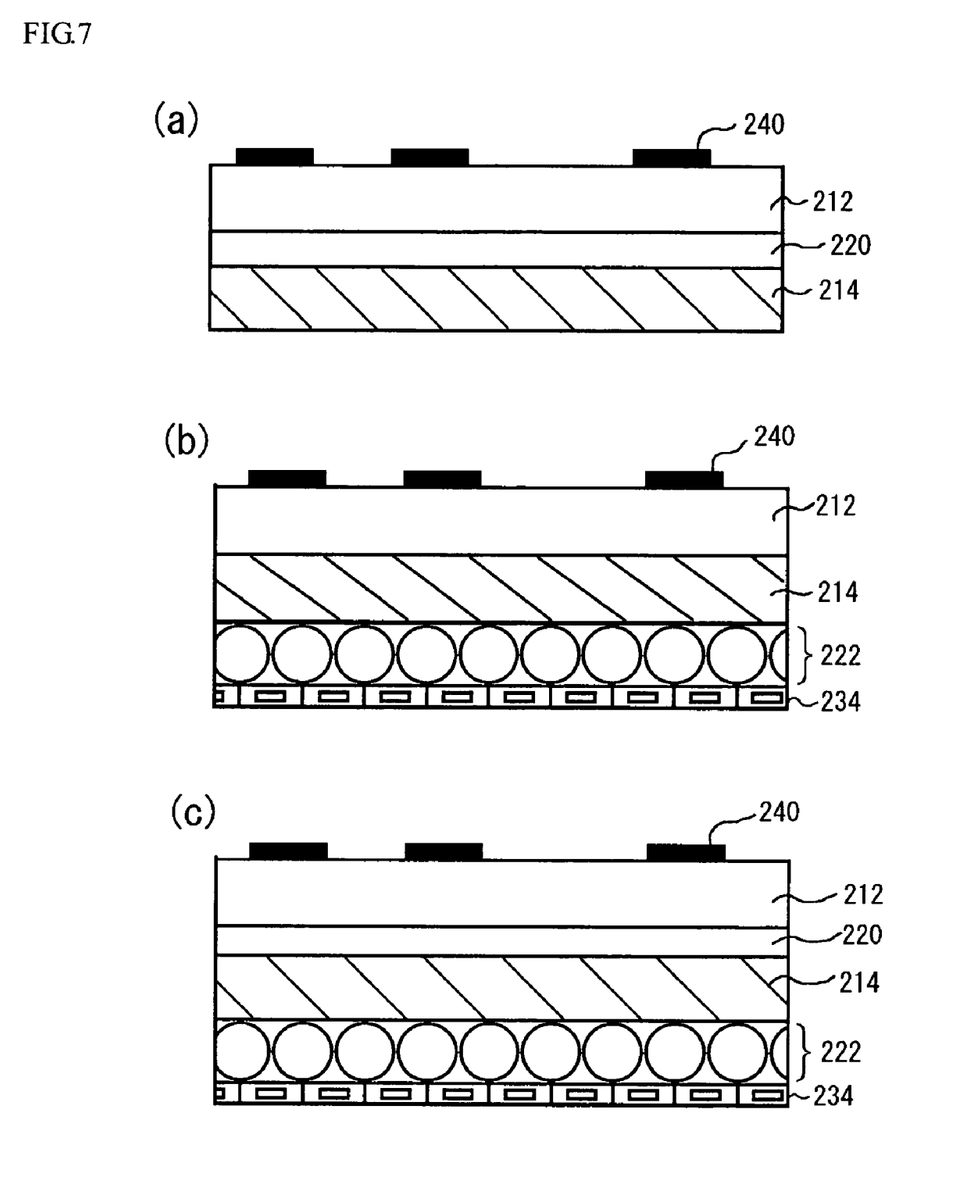
FIG. 7(a), FIG. 7(b) and FIG. 7(c) are schematic views, which shows embodiments in which an information code is printed by the ink marking method.

An embodiment will be described next in which the ink marking method is used to print an information code on a transparent material layer. FIGS. 7(a), 7(b), and 7(c) show laminated members on which an information code is printed by the ink marking method. FIG. 7(a) shows a laminated member in which a transparent material layer 212, a hologram layer 220, and a reflection-reduction layer (pearl pigment layer) 214 are laminated. FIG. 7(b) shows a laminated member in which a transparent material layer 212, a reflection-reduction layer 214, and a retroreflection layer 222 are laminated. FIG. 7(c) shows a laminated member in which a transparent material layer 212, a hologram layer 220, a reflection-reduction layer 214, and a retroreflection layer 222 are laminated. An interference material layer 234 is provided under the retroreflection layer 222 and produces interference colors. The reflection-reduction layer may be provided under the retroreflection layer, as shown in FIGS. 5(b) and 5(c). Unlike the laminated members shown in FIGS. 6(a) 6(b), and 6(c), the laminated members shown in FIGS. 7(a), 7(b), and 7(c) have information codes 240 printed on surfaces of the laminated members by ink. In the present embodiment, the information code 240, printed in ink, serves as high-reflectance portions, and other portions on which nothing is printed serve as low-reflectance portions.

In the embodiment shown in FIGS. 7(a), 7(b), and 7(c), since the information code 240 is printed in ink, a hologram image of the hologram layer may be visually impaired. To prevent this problem, for example, ink which is transparent in a visible light region and reflects light in an infrared region is used to print the information code, and infrared light is used to read the information code. When ink with an inconspicuous color is used, the design features of products can be protected. However, the type of ink which can be used is limited to some extent. In addition, information codes printed with ink have slightly lower friction-resistance and weather-resistance than indented-and-non-indented information codes.

When the information code is engraved as an indented-and-non-indented code on a transparent material layer by the laser marking method, as shown in FIG. 5(a), FIG. 5(b), FIG. 5(c), FIG. 6(a), FIG. 6(b), and FIG. 6(c), a laminated member on which the information code is engraved is obtained without impairing the hologram image. Superior friction-resistance and weather-resistance are also provided.

Figure 8:
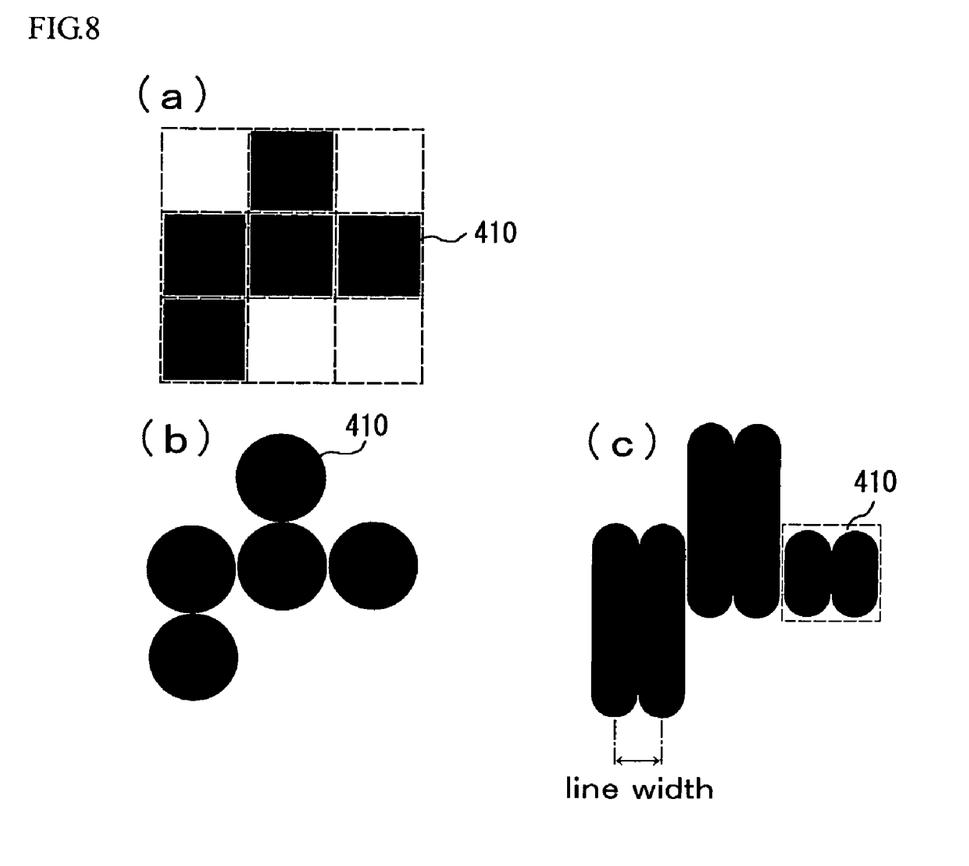
FIG. 8(a), FIG. 8(b) and FIG. 8(c) are schematic views, which show some examples of two-dimensional code.

A two-dimensional code used in the present invention will be described briefly. Information data is binarized and recorded two dimensionally in a two-dimensional code. For example, black and white are used to record data, or indented portions and non-indented portions are used to record data. FIGS. 8(a) to 8(c) show some examples of a two-dimensional code. As shown in FIG. 8(a), information is recorded by a pattern formed of cells 410. The cells 410 correspond to indented portions. In many cases, square cells are used as the cells 410. The shapes of the cells are not limited to squares, however. They can be circular dots, as shown in FIG. 8(b), and can also be shapes formed of multiple thick lines, as shown in FIG. 8(c). The only requirement is that a cell pattern can be read. A dot is produced by a laser without moving the laser beam, and the dot has almost a circular shape. The size of the dot can be adjusted. Multiple thick lines can also be used as a cell. FIG. 8(c) shows a case in which two thick lines are drawn as a cell. Generally, multiple thick lines have a higher reading accuracy than dots.

A laser marking method for a two-dimensional code has been described. The present invention provides successful reading results with various methods. The information code used is not limited to a two-dimensional code.

The following reading test of an indented-and-non-indented code was performed with laminated members according to the present invention.

A PET film was used for the transparent material layer, and indented portions (high-reflectance portions) were formed on a surface of the PET film by the laser marking method to generate an indented-and-non-indented two-dimensional code.

The laminated members were made in the following way. A PET film 100 µm thick was used for the transparent material layer. As the material of the reflection-reduction layer, 1 gram of a pearl pigment and 15 grams of nitrocellulose lacquer No. 4341 (made by Musashi Paint Co., Ltd.) were mixed, stirred and dispersed by a disperser, drawn down over the PET film 100 µm thick by a doctor blade with a margin of 101 µm, and dried.

A dot code was written by the laser marking method. The surface of the transparent material layer was irradiated by a laser emitted from a $CO_2$ Laser Marker (LSS-S050VAH made by Horiuchi Electrics Co. Ltd) to form indented portions each having a radius of 100 µm and a depth of about 50 µm to print an indented-and-non-indented code under conditions in which a 5-inch focal-length lens was used, the laser output was set to 12% (actually in a range of 10% to 14%, where 100% corresponds to an output power of 12 W), and the illumination time was set to 1.0 ms. The indented-and-non-indented code conformed to a two-dimensional data matrix method (30 alphanumeric characters each written in a 4.0 mm by 4.0 mm square).

To form indented portions each having two thick lines, as shown in FIG. 8(c), in a cell 200 µm long and 50 µm depth, the $CO_2$ Laser Marker (LSS-S050VAH made by Horiuchi Electrics Co. Ltd) was used under conditions in which a 3-inch focal-length lens was used, the laser output was set to 10% (actually in a range of 8% to 14%, where 100% corresponds to an output power of 12 W), and a line width (horizontal moving distance of the laser beam in drawing a cell) was set to 100 µm.

As a code reading apparatus, THIR-3000L (made by Tohken Co. Ltd) was used.

In the test, laminated members (examples 1 to 3) with the pearl pigments used in their reflection-reduction layers being changed, according to the present invention, and a transparent film (comparative example 1) on which an indented-and-non-indented code was printed were used. Dot-type cells were used.

EXAMPLE 1

A PET film was used for the transparent material layer, and Prevail SBY-75 (made by Shiseido Co. Ltd) was used as a pearl pigment in the reflection-reduction layer.

EXAMPLE 2

A PET film was used for the transparent material layer, and Prevail Blue-BP (made by Shiseido Co. Ltd) was used as a pearl pigment in the reflection-reduction layer.

EXAMPLE 3

A PET film was used for the transparent material layer, and Prevail Green-GR (made by Shiseido Co. Ltd) was used as a pearl pigment in the reflection-reduction layer.

Comparative Example 1

A PET film only was used without a reflection-reduction layer.

Table 2 shows test results of reading accuracy of the laminated members (Examples 1 to 3) according to the present invention and the transparent film (Comparative Example 1). A white sheet of paper, having the highest reflectance, was used as a substrate.

TABLE 2

| | COLOR OF SUBSTRATE (COLOR PAPER) | READING ACCURACY |
|---|---|---|
| EXAMPLE 1 | WHITE | Δ |
| EXAMPLE 2 | WHITE | ○ |
| EXAMPLE 3 | WHITE | ○ |
| COMPARATIVE EXAMPLE 1 | WHITE | X |

○: ALMOST NO ERRORS
Δ: SOME ERRORS OCCURRED
X: CAN SELDOM READ

As can be understood from Table 2, almost no reading errors occurred in Examples 2 and 3. In Example 1, some errors occurred but the code could be read. In Comparative Example 1, the code could be seldom read. It is understood that the information code can be read sufficiently accurately when the laminated members according to the present invention are used.

One reason why some reading errors occurred in Example 1 was assumed to be an excessive amount of light reflected by the substrate, having a high reflectance, too large to be reduced by the light scattering effect of the reflection-reduction layer. However, this test was conducted under strict conditions, and therefore, it is expected that even the laminated member of Example 1 can achieve sufficient performance in actual conditions. In a subsequent test where the color of the substrate was changed, sufficient reading accuracy was obtained. Table 3 shows test results.

TABLE 3

| COLOR OF SUBSTRATE (COLOR PAPER) | BLACK | YELLOW | GREEN | BLUE | RED |
|---|---|---|---|---|---|
| EXAMPLE 1 | ○ | ○ | ○ | ○ | ○ |
| EXAMPLE 2 | ○ | ○ | ○ | ○ | ○ |
| EXAMPLE 3 | ○ | ○ | ○ | ○ | ○ |
| COMPARATIVE EXAMPLE 1 | Δ | X | X | X | X |

○: ALMOST NO ERRORS
Δ: SOME ERRORS OCCURRED
X: CAN SELDOM READ

It is understood from Table 3 that, when Comparative Example 1 was used, some reading errors occurred even when the substrate was black, having the lowest reflectance, and the information code could not be read with the other colors. In Examples 1, 2, and 3, however, the information code could be read correctly. It is understood from the above-described tests that, compared with conventional transparent film on which information is engraved, laminated members according to the present invention allow correct reading of information codes with almost no limitation on the color of the substrate.

As described above, according to a laminated member on which an information code is recorded, of the present invention, since a reflection-reduction layer is provided to reduce reflected light advancing to a transparent material layer, and thereby a difference in the amounts of reflected light between high-reflectance portions and low-reflectance portions is made large, the information code can be read highly accurately by a usual reading apparatus.

An article on which a laminated member according to the present invention is attached achieves an improved anti-counterfeiting effect, with a hologram layer and/or a retroreflection layer in combination. An Information code recorded on a laminated member can be used for product information management.

What is claimed is:

1. A laminated member comprising:
    a transparent material layer having an incident light side and a non-incident light side opposite the incident light side, the transparent material layer comprising:
        low-reflectance portions and high-reflectance portions having a higher reflectance than the low-reflectance portions,
            wherein the high-reflectance portions are indented portions of the incident light side of the transparent material layer and the low-reflectance portions are flat, non-indented portions of the incident light side of the transparent material layer,
            wherein a distributed pattern of said high-reflectance portions form an information code, and
    a reflection-reduction layer comprising pearl pigment attached to the non-incident light side of the transparent material layer, thereby defining an incident light side and a non-incident light side of the laminated member, said reflection-reduction layer reducing the amount of reflected light passing through the laminated member.

2. The laminated member of claim 1, further comprising a hologram layer between the transparent material layer and the reflection-reduction layer, said hologram layer reproducing an image with the use of incident light.

3. The laminated member of claim 1, further comprising a retroreflection layer between the transparent material layer and the reflection-reduction layer, said retroreflection layer returning incident light in the direction opposite to a direction in which the incident light advances.

4. The laminated member of claim 1, further comprising an adhesive layer, wherein the adhesive layer is attached to a non-incident light side of the laminated member.

5. An article comprising the laminated member claim 1, and a substrate, wherein the laminated member is attached to the substrate.

6. The laminated member of claim 2, further comprising a retroreflection layer between the hologram layer and the reflection reduction layer.

7. A laminated member comprising, in order:
    (a) a transparent material layer having an incident light side and a non-incident light side, opposite the incident light side, the transparent material layer comprising:
        low-reflectance portions and high-reflectance portions having a higher reflectance than the low-reflectance portions, a distributed pattern of said high-reflectance portions comprising an information code,
    (b) a hologram layer, said hologram layer reproducing an image with the use of incident light, (c) a reflection-reduction layer comprising pearl pigment attached to the non-incident light side of the transparent material layer said reflection-reduction layer reducing the amount of reflected light passing through the laminated member, (d) a retroreflection layer comprising transparent microspheres and resin, said retroreflection layer returning incident light in the direction opposite to a direction in which the incident light advances, and (e) an interference layer comprising plate-like mica coated with titanium dioxide.

8. A laminated member comprising, in order:

(a) a transparent material layer having an incident light side and a non-incident light side, opposite the incident light side, the transparent material layer comprising:
low-reflectance portions and high-reflectance portions having a higher reflectance than the low-reflectance portions, a distributed pattern of said high-reflectance portions comprising an information code, (b) a reflection-reduction layer comprising pearl pigment attached to the non-incident light side of the transparent material layer said reflection-reduction layer reducing the amount of reflected light passing through the laminated member, (c) a retroreflection layer comprising transparent microspheres and resin, said retroreflection layer returning incident light in the direction opposite to a direction in which the incident light advances, and (d) an interference layer comprising plate-like mica coated with titanium dioxide.

* * * * *